March 4, 1930.　　　　J. D. SNOW　　　　1,749,306

LAWN MOWER SHARPENER

Filed Feb. 4, 1929

INVENTOR.
JOSEPH D. SNOW,
BY
　　*Jerry A Matthews*
ATTORNEY.

Patented Mar. 4, 1930

1,749,306

UNITED STATES PATENT OFFICE

JOSEPH D. SNOW, OF BEDFORD, INDIANA

LAWN-MOWER SHARPENER

Application filed February 4, 1929. Serial No. 337,362.

My invention relates to an implement for use in sharpening the blades of a lawn mower.

In accordance with my invention, I provide an extremely simple implement for use in sharpening the curved blades of a lawn mower. The implement is so constructed that a portion thereof slidably engages the stationary blade of the lawn mower and is guided thereby during its movement. This engagement retains the implement in the proper angular position. During the longitudinal travel of the implement, the reel is turned, whereby the curved blade is turned and the portion of the blade being sharpened, is retained at the same distance from the stationary blade.

Figure 1:
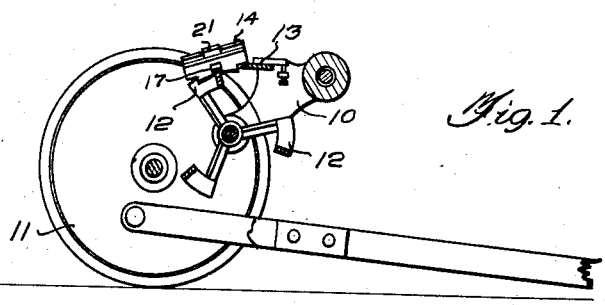
Figure 2:
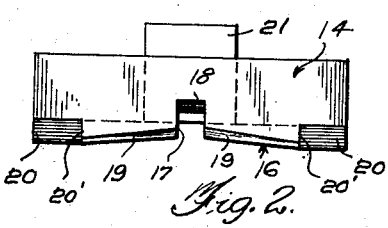
Figure 3:
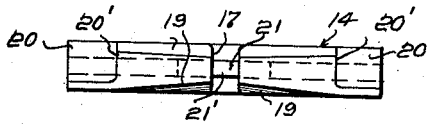
Figure 4:
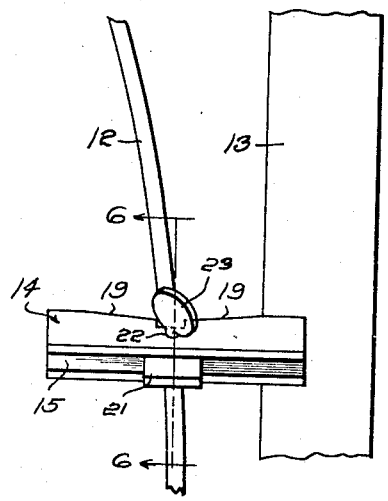
Figure 5:
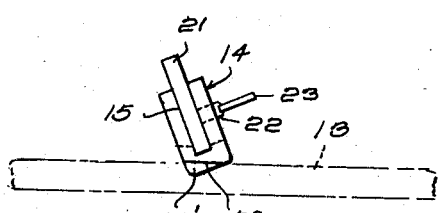
Figure 6:
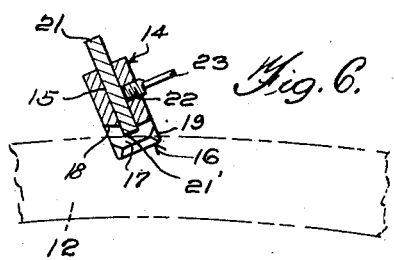

In the drawings, forming a part of this specification, and in which like numerals are employed to designate like parts throughout the same, Figure 1 is a side elevation of a lawn mower blade sharpening implement embodying my invention, showing the same in use, Figure 2 is a side elevation of the implement removed, Figure 3 is a plan view of the same, Figure 4 is a plan view of the implement, showing the same in use, Figure 5 is an end elevation of the implement, and, Figure 6 is a transverse section taken on line 6—6 of Figure 4.

In the drawings, wherein for the purpose of illustration, is shown a preferred embodiment of my invention, the numeral 10 designates the frame of a lawn mower, supported by wheels 11, in the usual manner. Mounted upon the frame is the reel embodying the curved blades 12. Co-acting with the rotatable curved blades is a stationary blade 13, attached to the frame 10, as is well known. This is the construction of the ordinary lawn mower.

My blade sharpening implement embodies a body portion 14, preferably formed of metal, and preferably U-shaped in cross section, affording an inner space 15. The lower end 16 of the body portion is closed, while its upper end is open. The lower end 16 is provided with a transverse notch 17, extending through the opposite side walls of the U-shaped body portion, said notch preferably extending to a higher elevation in one of the walls, terminating at a beveled wall 18, as clearly shown in Figure 6. The closed end wall 16 is also preferably provided with longitudinally inclined faces 19, extending upwardly toward the notch 17, thereby serving to more readily guide the blade 12 into the notch. At the ends of the bottom wall 16, are formed transversely inclined or beveled guide faces 20, adapted to slidably contact with the stationary blade 13, as will be described.

The numeral 21 designates a sharpening element, preferably in the form of a rectangular plate of highly tempered steel. This sharpening element is inserted within the body portion 14 and projects into the notch 17. The sharpening element is held in place by a set screw 22 carrying a thumb piece 23. By forming the sharpening element polygonal, each face may be presented to the sharpening position, as desired. The cutting edges of the sharpening element may be re-sharpened by means of an emery stone, or the like.

The operation of the implement is as follows:

The lawn mower is inverted and one beveled or inclined guide face 20 is brought into contact with the upper surface of the stationary blade 13, this face 20 and shoulder 20', constituting a guide for the body portion. The body portion is manipulated so that the curved blade 12 is inserted within the notch 17. The beveled face 20 retains the body portion 14 at a transverse inclination, whereby a corner or edge of the cutting face 21' is brought into contact with the cutting edge of the blade 12. As blade 12 operating within the notch 17, as the body portion is drawn from the end of the blade 12 remote from the operator, toward the opposite end of the blade 12, such blade is turned toward the stationary blade 13.

It is to be understood that the form of my invention, herewith shown and described, is to be taken as a preferred example of the same and that various changes in the shape, size and arrangement of parts, may be resorted to without departing from the spirit of my invention, or the scope of the subjoined claims.

Having thus described my invention, I claim:—

1. An implement for sharpening lawn mower blades, comprising a body portion which is U-shaped in cross section and provided at its closed edge with a notch and having a beveled guide face, and a sharpening element inserted within the body portion and projecting into the notch.

2. An implement for sharpening lawn mower blades, comprising a body portion which is U-shaped in cross section and provided at its closed edge with a notch and having a beveled guide face, a sharpening element inserted within the body portion and projecting into the notch, and means to clamp the sharpening element in place within said body portion.

3. An implement for sharpening lawn mower blades, comprising a body portion which is U-shaped in cross section and embodying spaced side walls and a closed edge, said closed edge having a transverse notch extending through the side walls and spaced from the ends of the body portion, said body portion being also provided at its ends with beveled guide faces formed in the closed edge, a transverse notch serving as guide means for the movable blade and the beveled guide faces being adapted for engagement with the stationary blade, a sharpening blade inserted within the body portion and projecting into the notch and means to clamp the sharpening blade in place.

In testimony whereof I affix my signature.

JOSEPH D. SNOW.